United States Patent [19]

Grube et al.

[11] Patent Number: 4,540,467

[45] Date of Patent: Sep. 10, 1985

[54] METHOD FOR FRAGMENTING MUNICIPAL SOLID WASTES

[76] Inventors: Kenneth E. Grube, 150 Anchorage Cir.; Vincent E. Harrington; James V. Harrington, both of 19 Dolphin Rd., all of Groton, Conn. 06340

[21] Appl. No.: 592,723

[22] Filed: Mar. 21, 1984

Related U.S. Application Data

[63] Continuation of Ser. No. 412,078, Aug. 27, 1982, abandoned, which is a continuation of Ser. No. 56,606, Jul. 11, 1979, abandoned, which is a continuation-in-part of Ser. No. 809,791, Jun. 24, 1977, abandoned, which is a continuation-in-part of Ser. No. 620,068, Oct. 6, 1975, Pat. No. 4,050,899, which is a continuation-in-part of Ser. No. 429,733, Jan. 2, 1974, abandoned.

[51] Int. Cl.$^3$ .............................. D21B 1/32; D21B 1/36
[52] U.S. Cl. ........................................ 162/4; 162/6; 162/21; 162/22; 71/64.03; 71/64.04; 134/17; 164/132; 241/2
[58] Field of Search .................. 164/131, 132; 241/2, 241/DIG. 10, DIG. 38; 134/17, 30; 162/6, 4, 21, 22; 71/64.03, 64.04, 9; 209/930

[56] References Cited

U.S. PATENT DOCUMENTS

| | | | |
|---|---|---|---|
| 2,502,337 | 3/1950 | Moir | 164/131 |
| 2,597,896 | 5/1952 | Oster | 164/132 |
| 2,666,001 | 1/1954 | Marshall | 164/131 |
| 3,015,589 | 1/1962 | Everson et al. | 134/30 |
| 3,563,711 | 2/1971 | Hammond et al. | 164/132 |
| 3,939,066 | 2/1976 | Bauer | 241/2 |
| 4,073,662 | 2/1978 | Borom | 164/131 |
| 4,235,707 | 11/1980 | Burke, Jr. | 162/21 |

FOREIGN PATENT DOCUMENTS

0561763  7/1977  U.S.S.R. ........................ 162/21

OTHER PUBLICATIONS

Condensed Chemical Dictionary, 8th Edition, Hawley, 1974, p. 903.
Heuer, J. H., "Deinking Waste Papers with Sodium Peroxide", Paper Trade Journal, 1948.

*Primary Examiner*—S. Leon Bashore
*Assistant Examiner*—K. M. Hastings
*Attorney, Agent, or Firm*—Brumbaugh, Graves, Donohue & Raymond

[57] ABSTRACT

A method and apparatus for the removal of mold core material from metal castings and for fragmentation of municipal waste material, e.g., paper products, involves heating and hydrating the materials within a pressure vessel. Chemicals active on the material to be processed or the hydration water are added during hydration to soften the material to be removed or fragmented. Excess liquid in the vessel is drained and pressurized steam is added for a selected period of time. A suitable temperature and pressure are achieved such that the moisture or liquid carried by the processed material will rapidly turn to steam or vapor when the pressure in the vessel is rapidly reduced by quickly opening an unloading means at the bottom of the pressure vessel. The sudden release of the pressure in the vessel causes the moisture to change to steam and a certain portion of the liquid in the material to flash to vapor in accordance with thermodynamic laws. The resulting rapid expansion within the processed material fragments it.

7 Claims, 8 Drawing Figures

METHOD FOR FRAGMENTING MUNICIPAL SOLID WASTES

BACKGROUND OF THE INVENTION

This application is a continuation of application Ser. No. 412,078, filed Aug. 27, 1982, now abandoned, which was a continuation of U.S. application Ser. No. 056,606, filed July 11, 1978, now abandoned, which was a continuation-in-part of U.S. patent application Ser. No. 809,791 filed June 24, 1977 now abandoned which was a continuation-in-part of U.S. application Ser. No. 620,068 filed Oct. 6, 1975, now U.S. Pat. No. 4,050,899, which was a continuation-in-part of U.S. application Ser. No. 429,733, filed Jan. 2, 1974, now abandoned.

There has been a rapid increase in the per capita output of solid waste material as a result of the increasing affluence of our society. This is evident from the increase in the number of industrial and consumer products produced, many with molded parts, the increase in the amount of packaging material supplied with these products, and the general increase in the population being provided with such goods. During the production of these products and at the end of their useful lives, waste materials are created that must be disposed of.

Municipal waste in the form of paper products (e.g. packaging), garbage and other refuse is either disposed of by grinding and burying the material in a landfill type of operation, or by incineration. Such grinders require substantial maintenance because the metallic and similar hard components of the waste often damage grinding elements in such apparatus. Repair or replacement of the grinding elements is made more difficult and unpleasant by the obviously offensive residue of the municipal waste material left on the apparatus. In either instance the municipal waste material serves no further useful purpose; in the one instance it merely occupies space of relatively low value, and in the other instance it is dispersed to the atmosphere as combustion products which contribute to a level of air pollution which is particularly objectionable in areas of large population.

In the foundry industry, particularly in that part of the industry dealing with so-called investment castings made by the lost wax process and the like, a shell made of sand and other fragmented constituents is employed as the mold material. In many cases, at the end of the casting process, the sand shell adheres tenaciously to the metal, particularly in internal passageways. This material is often referred to as a core. See George W. Barnwell, *The New Encyclopedia of Machine Shop Practice*, Chapter 14, WM. H. Wise & Co., Inc., New York (1941). Typically chemical processes are presently employed for the removal of the shell, such as those shown in U.S. Pat. No. 2,502,337 to Moir and U.S. Pat. No. 2,666,001 to Marshall. However, these processes are generally inadequate, expensive, time consuming and harmful to the casting.

It would be useful if a process could be developed for breaking up at least some of the waste material from the production of products, their packaging and their eventual disposal, into small easily handled particles. Also it would be desirable if some of the useful ingredients in, for example, municipal waste could be extracted and reused.

SUMMARY OF THE INVENTION

The present invention is directed to the disposal of waste material and, more particularly, to the fragmentation of solid waste material from industrial production and the municipal waste from the packaging of products and the discarded products themselves.

In an illustrative embodiment of the present invention, castings having sand mold core attached to them/and or municipal waste material, such as homogeneous waste consisting of animal remains from a meat processing operation or inhomogeneous materials recovered from residential municipal trash collection, are placed in a pressure vessel unit which has a quick opening, unloading means, such as a hatch at the bottom of the unit. With the castings or the municipal waste in the vessel and the hatch closed and sealed shut, the material to be fragmented is presoaked in an aqueous chemical bath that effects either the material or the water. The chemical presoak may include (1) a wetting agent to aid penetration of the water into the material, (2) an acid or base to weaken the bonds holding the material together, (3) a bleach for removing inks, or (4) an acid for removing sugar and alcohol from the material. After the presoak, the excess liquid is then drained off and steam may be admitted to pressurize the vessel. The contents of the vessel are next brought to a predetermined pressure and temperature, preferably with the addition of moisture. Then the pressure is reduced by quickly opening the vessel, thereby allowing the sudden explosive decompression of its contents which results in a rapid expulsion thereof from the vessel. In the process of decompression and expulsion, the moisture and a certain portion of other liquid contained in the waste material will flash to steam and vapor in accordance with thermodynamic laws, for example, the proportion of moisture flashing being in accordance with the amount of heat present in excess of the heat required to maintain water at 212° F. (100° C.) at atmospheric discharge pressure.

This sudden flashing of the water to steam, with its accompanying large increase of volume will rupture much of the waste material into tiny fragments, but will not harm metallic objects, such as the casting to which the mold core waste material is attached, and other materials which will not absorb or contain water or other liquid under these conditions. Therefore, metal objects in the municipal waste, e.g. tin cans, will remain substantially intact, although closed containers may rupture and glass shatter. The glass may shatter under the explosive discharge from the vessel as well as from the thermal gradient through the glass as it cools from the elevated temperature, which cooling is more rapid because of the conversion of the moisture on the surface of the glass to steam.

In one representative embodiment of apparatus for practicing this invention, the pressure vessel is an autoclave which, as usually defined, is a device which uses superheated steam. The autoclave has a hatch at the top for loading the waste material or objects with waste material attached, e.g. castings, into the autoclave. Municipal waste may be dumped through the hatch directly from collection vehicles. Superheated steam is then admitted to the autoclave from a boiler for simultaneously heating and pressurizing the contents to a desired temperature and pressure and adding moisture to the contents.

The desired temperature and pressure for the contents of the autoclave is such that at least the moisture added to the contents by the steam will rapidly return to steam when the pressure on the contents of the autoclave is rapidly reduced. When the temperature and pressure of the contents of the autoclave have reached this desired pressure and temperature as determined by a pressure control valve between the boiler and autoclave, the flow of steam into the autoclave will drop substantially to zero, thereby providing a convenient way of determining that the contents have reached the desired pressure and temperature.

The pressure is then rapidly reduced by quickly opening an unloading hatch at the bottom of the autoclave to, for example, the atmosphere. The temperature of the contents of the autoclave then merely has to be at or slightly above 212° F. (100° C.) for the moisture in the contents to turn to steam. Where, for example, metal castings are being cleaned of casting shell, it has been found that saturated steam at a pressure of approximately 30 PSI and a corresponding temperature on the order of 250° F. prior to decompression, produces adequate results. The resulting explosive decompression of the contents of the autoclave expels the contents through the unloading hatch and fragments at least the moisture saturable components of waste material.

This description of a representative embodiment of apparatus for practicing the invention has thus far indicated that the waste material with which the invention has particular utility is waste material which comprises components which are moisture saturable, are closed containers, or are glass.

The method of the present invention is also applicable to the fragmentation of certain construction materials, e.g., concrete, wall board, timber and other materials which are porous. The water will be absorbed and will flash to steam upon compression, thereby causing the desired fragmentation of these materials. As a result, the fragmented particles will form more dense packing in land filling operations, while the other contents, such as the reinforcing rods, gravel and blue stone in concrete, may be reclaimed by various methods.

The invention has advantages over other apparatus, such as grinders for treating typical municipal and like solid waste in that it has no moving members which must interact with the solid waste and therefore no elements which are particularly subject to damage by metallic or other components of waste. Moreover, the temperature to which the waste material is raised in the pressure vessel (212° F. (100° C.) or higher for waste discharge to atmospheric pressure) substantially sterilizes the waste material in the pressure vessel so that any residue left in the vessel after the explosive decompression is sensibly inoffensive and any maintenance work performed on the pressure vessel is thus significantly less unpleasant.

BRIEF DESCRIPTION OF THE DRAWINGS

For a further understanding of the present invention, reference may be had to the accompanying drawings in which.

DESCRIPTION OF THE PREFERRED EMBODIMENTS

A first embodiment of the invention is shown in FIGS. 1–7. Other arrangements of parts and other details of construction will accomplish like results, resulting in other embodiments such as that shown in FIG. 8 which are also within the scope of the invention. The invention presented in the first embodiment is the combination of a comminuting device operating on the principal of sudden thermal expansion of an enclosed and heated liquid to vapor, and an associated specially devised pit structure which receives the discharge of the comminuting device and maintains the discharge in optimum condition for most effective composting of its biodegradable parts. The apparatus is specifically intended for the processing of solid wastes received from industrial production, e.g. the core material from metal castings, and municipal waste collection activities.

The method of treatment by this apparatus yields a product which is directly amenable to complete and effective separation as shown in our copending U.S. patent application Ser. No. 654,051 filed Jan. 30, 1976 (now U.S. Pat. No. 4,079,837) which is a continuation of U.S. application Ser. No. 451,087, filed Mar. 14, 1974 and titled "A System For The Separation of Fragmented Solid Waste" (now abandoned). These applications consider the advantage gained in separation systems as a result of providing the separation equipment with material treated as described herein. The condition of material treated as described herein assures that the separating machinery handling it will remain in a sensibly clean condition which will reduce corrosion and sealing problems and facilitate maintenance.

Figure 1:
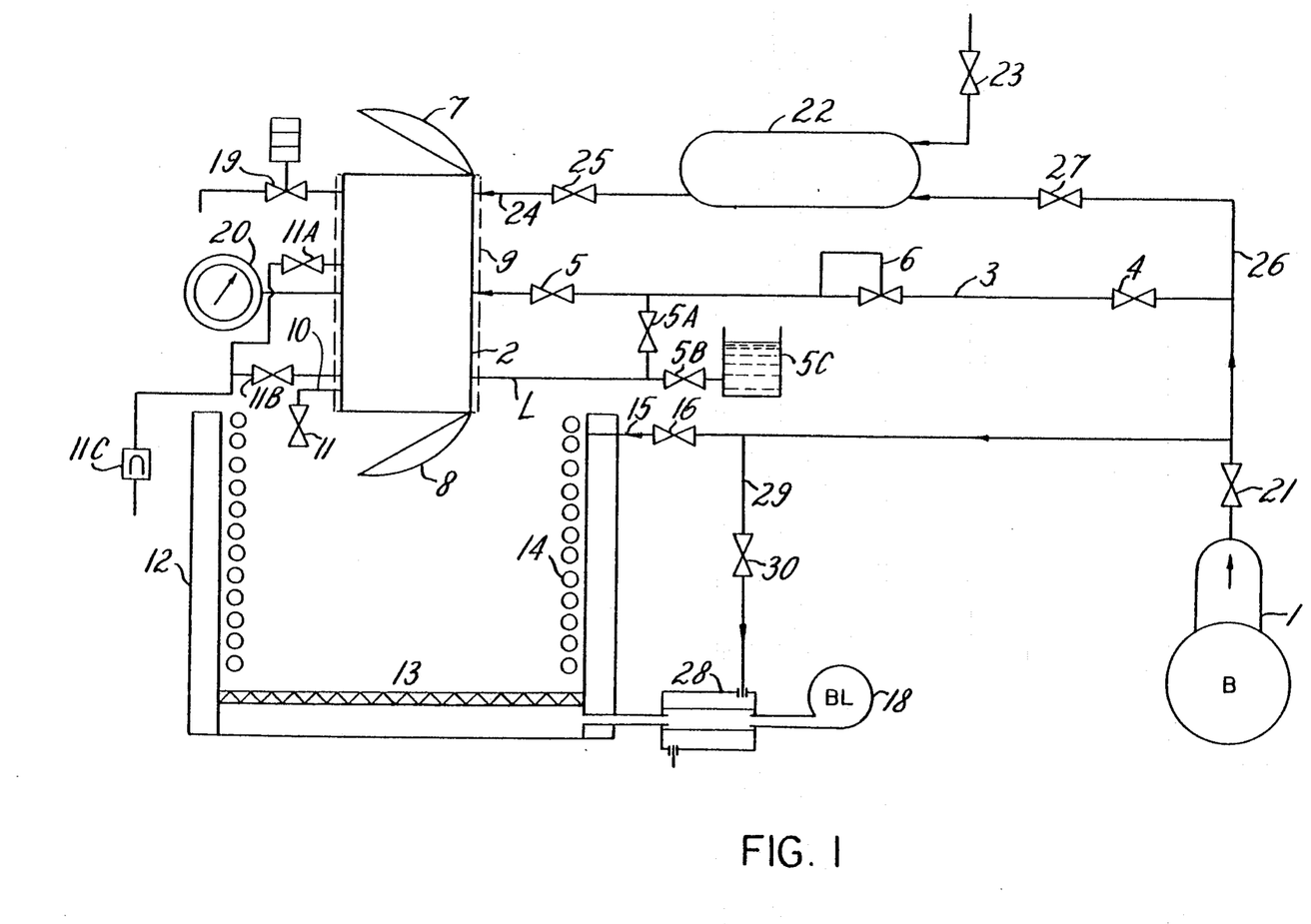
FIG. 1 is a schematic drawing showing the principal components of the invention and the interrelationships between them in one embodiment of the invention.

In FIG. 1, a boiler 1 is shown supplying steam to an autoclave or pressure vessel unit 2 through a steam line 3. Stop valves 4, 5, 21 and a pressure reducing valve 6, which (as is known) also inherently superheats the steam passing therethrough, are provided in the line 3. When the steam is being supplied to the unit, a loading hatch or door 7 at the upper end of the pressure vessel and a quick opening hatch or door 8 at the lower end of the pressure vessel are closed, forming a pressure tight boundary for the vessel, the direction from door 7 to door 8 being generally downward. The loss of heat from the vessel is minimized by an insulation jacket 9. A relief valve 19 is provided to protect the pressure vessel 2 from over-pressure and a guage 20 is provided to indicate the pressure vessel operating pressure. A stop valve 21 is provided to isolate the boiler from the balance of the system.

Prior to applying the steam to the autoclave 2, it is filled with the waste material to be processed. This may be a sand core material that is to be removed from castings and, or municipal waste material. The sand mold material may be gypsum based mold material used in casting low melting point metals such as aluminum, or compacted and bonded sand mold materials used for high melting temperature metals, e.g. stainless steels. The municipal waste that is included in the autoclave comprises components that are moisture saturable, are closed container, or are glass. A review of the following table of typical solid waste from a municipality will indicate that such treatable materials constitute a substantial proportion of such municipal waste.

TABLE I

REFUSE BREAKDOWN
CITY COLLECTION ONLY

|  | Percentage range by dry weight | |
| --- | --- | --- |
| Cardboard | 3.9 | 4.3 |
| Newsprint | 9.3 | 9.7 |
| Other paper | 38.7 | 39.2 |
| Yard trimmings | 11.9 | 16.0 |
| Wood | 0.6 | 1.3 |
| Rags/Cloth/Leather/Bedding | 2.4 | 2.6 |
| Tires | 0.1 | 0.2 |
| Other rubber | 0.1 | 0.2 |
| Plastics | 2.2 | 2.1 |
| Garbage | 2.0 | 2.1 |
| Ferrous cans | 5.6 | 6.3 |
| Ferrous metal | 0.9 | 1.2 |
| Aluminum cans | 0.5 | 0.6 |
| Other aluminum | 0.1 | 0.2 |
| Glass | 6.2 | 7.5 |
| Remainder* | 8.9 | 12.2 |

*Remainder is that portion of the refuse consisting of dirt, rocks, badly contaminated paper, etc.

The above table of typical municipal waste further indicates an advantage of the invention over incineration, a conventional way of treating such waste. Table II below identifies the minimum percentage of the total waste of each material identified in Table I and a corresponding typical specific heat for these materials.

TABLE II

|  | Minimum Percent | Specific Heat |
| --- | --- | --- |
| Cardboard | 3.9 | 0.55 |
| Newsprint | 9.3 | 0.55 |
| Other paper | 38.7 | 0.55 |
| Yard trimmings | 11.9 | 0.75 |
| Wood | 0.6 | 0.55 |
| Rags, cloth, leather | 2.4 | 0.55 |
| Tires | 0.1 | 0.34 |
| Rubber | 0.1 | 0.34 |
| Plastics | 2.2 | 0.34 |
| Garbage | 2.0 | 1.0 |
| Ferrous Cans | 5.6 | 0.11 |
| Ferrous Metal | 0.9 | 0.11 |
| Aluminum Cans | 0.5 | 0.225 |
| Other Aluminum | 0.1 | 0.225 |
| Glass | 6.2 | 0.2 |
| Remainder | 8.9 | 0.2 |

From the percentage composition and specific heats identified in Table II, a weighted average specific heat of the waste from a municipality may be computed as 0.458. Then, assuming a temperature differential between the temperture of the waste material in the pressure vessel or autoclave and that into which it is discharged from the vessel of 220° F. (110° C.) and a total thermal efficiency of 45% for raising the contents of the pressure vessel to the desired temperature, the energy for treating each pound of such waste according to the invention may be computed as 223 BTU per pound. Even generously rounding this energy requirement to about 300 BTU per pound, this requirement will be seen by those in the art to compare favorably with the energy required for incineration of such waste which may range to about 1,000 BTU per pound.

The method of the present invention can also be used to fragment construction materials, e.g., concrete, wall board, timbers and other materials which are porous. These construction materials may either absorb moisture in the autoclave from the steam or may be presoaked prior to treatment so that upon heating with steam the water will be absorbed and will flash to steam upon decompression, thereby causing the desired fragmentation. By fragmenting the more porous elements, the resulting material will form a more dense packing for subsequent use in land fill operations. The other contents, such as reinforcing rods and gravel and blue stone in concrete, as one example, may be reclaimed by such methods as pointed out in our U.S. Pat. No. 4,079,837.

After the material to be treated is placed in the autoclave 2 it is preferably subjected to chemical treatment in a presoak operation. To accomplish this a means for injecting chemicals which might be beneficial to the process, such as for the breakdown of plastic materials as one example, is provided. One embodiment includes a tank 22, a tank filling connection 23, a charging pipe 24 and charging pipe stop valve 25 for charging the contents of tank 22 into pressure vessel 2. The pressure required for charging is obtained from the boiler through pipe 26 and is controlled by isolation valve 27.

Where metal investment castings are to be cleaned or paper products fragmented, it is desirable that the materials within the vessel or autoclave 2 be soaked for a predetermined period of time in suitable wetting or bleaching compositions. For this purpose a supply tank 5C may be provided for containment of the fluid compounds to be injected into the vessel 2. Fluid flow between the tank 5C and the vessel may be controlled by means of a suitable valve 5B. Fluid from the tank may be propelled toward the vessel through a flow or supply line L either by gravity, air injection or pumping, as desired. A valve 5A interconnects the supply lines 3 and L for the purpose of admitting steam to the vessel 2 through the line L.

The level of soaking fluid held within the vessel 2 may be maintained by one or more drain taps 11A or 11B, for example, which drain through a bucket trap 11C. The fluid level within the vessel is preferably maintained above the entry point for steam entering through the fluid line L.

Examples of the fluids to be supplied to the vessel from the tank 5C and their appropriate uses are as follows:

A. Wetting compounds to insure wetting of paper, wood, rags and other water absorbers to enhance the contact between chemicals contained in the soaking solution and the material within the vessel 2. Glycerides found in such household products as dish washing liquids are appropriate wetting agents. One commercial wetting compound known as Triton X-100 has been found particularly effective. Triton X-100 is very effective in weakening the bond of gypsum based mold materials to metal castings so that explosive decompression is more effective.

B. Bleaching compounds mixed with wetting agents for application to paper products for removal of inks and other coloring matter. Appropriate bleaching compounds are chlorine or chloride compounds, as well as hydrogen peroxide.

C. Acids, such as sulfuric acid, which reduce cellulose to sugars might be utilized to permit explosive decompression of paper products to become an early step in the manufacture of industrial alcohols. As an example, a 3 to 5% solution of hot sulfuric acid will reduce wood, paper and cloth to sugars. Where the mold shell materials include a silica sand mixture held together with special colloidal sand and binders, known as "hard shell", acids, e.g. hydrofluoric or phosphoric acids, may be introduced during the presoak step to faciliate cleaning of this waste material from the metal castings. A 5% solution of hydrofluoric acid is preferred.

D. Bases, such as a saturated solution of sodium hydroxide are also used to soften compacted sands, i.e. hard shell, used in investment casting shell molds.

It should be recognized that presoaking the material in the vessel 2 with one or more of the foregoing compositions is not simply for the purpose of wetting or hydrating the material under treatment by softening the water. Hydration would occur in any event as a result of the condensation of steam admitted to the autoclave prior to decompression, although not to the extent achieved with a wetting agent such as Triton X-100. The presoaking step conveys the appropriate chemicals in solution to the worksite and maintains them at the worksite long enough to permit the desired reactions. This is particularly desirable with chemicals that do not vaporize at the temperature of the entering steam and which would tend to precipitate from the solution onto the walls of the apparatus. In general, inorganic agents, many with high liquefaction temperatures are most appropriately handled by the presoak step described above.

The liquid utilized to presoak material in the vessel is drained through the taps 11A or 11B. Heating is then accomplished through the introduction of steam under pressure. Where desired, the vessel may be pressurized during the presoak step. Such pressurization facilitates wetting of the materials to be fragmented.

Steam is a preferred way of heating the contents of the pressure vessel because the heat transfer rates in the condensation of steam are extremely high to thereby permit rapid heat transfer to the contents of the pressure vessel and correspondingly rapid cycling of the pressure vessel unit through the heating step of the invention. The use of superheated steam in a pressure vessel, such as an autoclave, is particularly preferred because the higher temperature of superheated steam at any pressure gives still greater heat transfer rates between the steam and the contents of the pressure vessel. This permits the use of relatively lower pressures in the autoclave. Steam is also preferred because it adds moisture for saturating susceptible components of the material for fragmenting them upon decompression.

Suitable pressures within the pressure vessel are well within the range of pressures for which vessels may be readily designed. These pressures are in a range of from 1 to about 3 atmospheres (absolute) with about 15 lbs. per sq. in. (1.1 kg/cm$^2$) above atmospheric pressure or about 2 atmospheres (absolute) being preferred. Cleaning of investment castings and fragmentation of proper products occur efficiently where the pressures prior to explosive decompression fall within the range of from 30 to approximately 90 PSIG. It should be noted however that pressure vessels capable of operating at 300 lbs. of pressure with corresponding saturated steam temperatures on the order of 423° F. might also be used. In general, higher autoclave pressures and temperatures prior to decompression yield more thorough fragmentation. Standards for the design of such pressure vessels have been set forth by the American Society of Mechanical Engineers and are well understood by those in the art.

At the end of the heating cycle, the contents of the unit are discharged through either the quick opening lower door 8 (or through a discharge pipe 10 and discharge valve 11 as more fully described with later reference to FIG. 2) to a containing device defining a pit 12. One embodiment of a containing device may be a circular vat of masonry construction with a grate 13 at its lower end to support the weight of the contents, and heating coils 14 supplied with steam from boiler 1 through pipe 15 and valves 16, 21. The heating coils are located along the sides of the pit for controlling the pit temperature. A blower device 18 and heat exchanger 28, which also receives steam from boiler 1 via line 29 and valves 21, 30, supply heated air to the bottom of the pit beneath grate 13. The purpose of controlling the temperature in the pit is to maintain material in it at the optimum temperature for the bacterial activity of a composting process. The purpose of the blower is to insure an adequate air supply for this aerobic bacterial process.

Other embodiments of a containing device are an excavated pit or an exposed pile of material in which bacterial action may proceed. Other embodiments of heating means for the composting step include merely heating the discharge of air from blower 18 before it passes through the bed of material. This would be done using heat exchanger 28 and steam from the boiler through pipe 29 and isolation valve 30. Naturally, if sand from casting shell molds, or other material that is not biodegradable, is the only waste material the composting pit and the heat supply can be eliminated.

Figure 2:
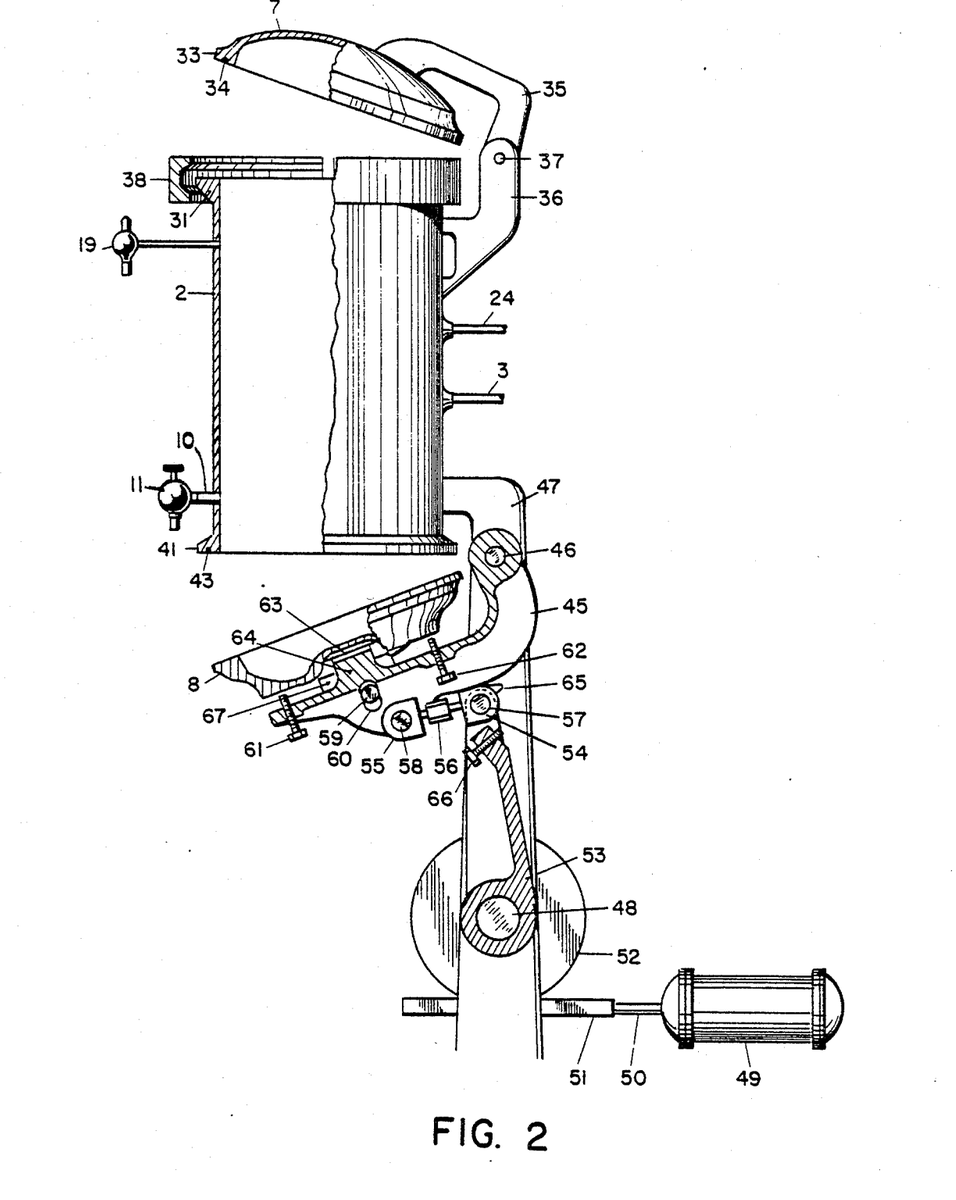
FIG. 2 shows the assembly and operation mechanism of the autoclave or pressure vessel, involving the upper cover locking mechanism and the lower cover quick opening, closing and locking mechanism in one embodiment of the invention.

FIG. 2 shows one embodiment of a pressure vessel assembly capable of functioning to cause vapor explosive decompression of solid waste materials. It consists of a cylindrical vessel portion 2 with flanges 31 and 41 at each end. The upper end is closed by the loading hatch or cover 7 having a flange 33 and a seal ring 34 which prevent the escape of vapor when the interior of the vessel is pressurized The cover 7 is supported and attached to the pressure vessel by a hinge mechanism consisting of an upper bracket 36 fixed to the cylindrical portion of the pressure vessel and a bracket 35 connected to the cover. The two brackets are held in rotational relationship by hinge pin 37. The cover 7 is held closed and sealed to the flange 31 by means of a split clamp ring 38 which wedges them together when the clamp ring is closed. The combination of flanges 31 and 33, clamp ring 38 and seal 34 form a vapor tight and pressure resistant upper end closure for the pressure vessel when properly engaged in the closed position.

The cylindrical portion of the pressure vessel 2 is penetrated by piping 3 for the admission of vapor, pipe 24 for the injection of chemicals, drain 10, relief valve 19 and such other conduits as may be desired.

The lower end of the pressure vessel 2 terminates in flange 41 containing a seal ring 43. The quick opening hatch or lower cover 8 supported by the hinged arm 45, rotates about a hinge pin 46 and seals the lower end of the pressure vessel to form a vapor tight enclosure during the heating and pressurizing cycle. A structural element 47 attached to the pressure vessel supports the hinge pin 46 and serves to maintain positional alignment between a drive shaft 48 and the driving parts.

Lower cover 8 is power driven to the opened and closed positions through an angle of 90° to 100°, the cover being shown in FIG. 2 in the partially opened position. One embodiment of the power driving apparatus includes a hydraulic cylinder 49, a piston rod 50 and a rack mechanism 51 driving a bull gear 52, although other hydraulic, pneumatic or electrical driving apparatus would be equally suitable for the purpose. Bull gear 52 and a rotating arm 53 are both keyed or splined to the drive shaft 48 causing them to rotate together as an assembly. The upper part of the arm 53 terminates in a pinned connection to a turnbuckle link produced by a pin 57. The turnbuckle link has a left hand threaded eyebolt 54, a right hand threaded eyebolt 55 and a turnbuckle nut 56. The turnbuckle link is rotatably connected to hinge arm 45 by a pin 58. The operation of cylinder 49 causes rotation of arm 53 which pushes or pulls the turnbuckle assembly to cause rotation of the hinge arm 45, about the pin 46, that carries the cover 8. This assembly permits rapid opening and closing of the cover 8. Hinge arm 45 carries and supports the cover 8, keeping it captive while permitting relative rotary and translational movement between them for purposes of alignment and proper seating in the closed position of the cover 8 on the flange 41 and the seal ring 43.

The cover 8 has ears 67 normal to its outer surface which carry a pin 59. This pin passes through a slotted hole 60 in the hinge arm 45, allowing relative translative motion in the direction of and to the limits of the slotted hole. The cover 8 and the pin 59 may also rotate in the hole, being restrained in the rotary movement by stop bolts 61 and 62 carried in the hinge arm 45. A leaf spring 63, supported on its ends by supports on the cover, may be compressed by a nose portion 64 on the hinge arm 45 which bears on the center of the spring. When the cover 8 is suitably seated on the flange 41, continued rotation of the driving arm 53, the turnbuckle and the hinge arm 45, causes pin 57 to pass through dead center, thus compressing spring 63 to an amount which may be adjusted by the setting of turnbuckle nut 56 which operates in conjunction with the eyebolts 54 and 55.

Figure 3:
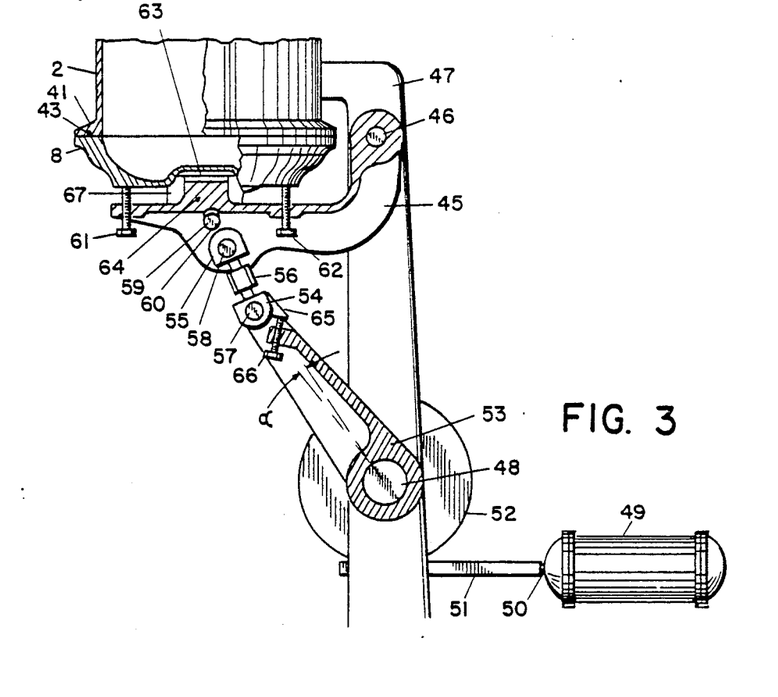
FIG. 3 shows the lower cover of the autoclave in the closed and locked position for the same embodiment of the invention as FIG. 2.

FIG. 3 shows the lower cover drive operating mechanism in the closed position. This mechanism serves several functions. It provides the necessary flexibility for the cover 8 to align itself properly in relationship to lower pressure vessel flange 41 and lower seal 43. It provides a locking mechanism for cover 8 in the closed position by virtue of passing beyond dead center by a fixed angle, after which fixed face 65 on eyebolt 54 contacts stop bolt 66 fixed to driving arm 53, thereby preventing further rotation away from the stop position past dead center. The mechanism is now locked by internal forces in this position until the driving mechanism comprised of the cylinder 49, the rod 50 and the rack 51, rotate the bull gear 52, the arm 53 and the shaft 48 in the direction tending to open the cover 8.

The force seating cover 8 on flange 41 is controlled by the deflection of leaf spring 63, and this force must be sufficient to carry the deadweight of the contents of pressure vessel 2, plus the load resulting from the pressure in the pressure vessel, plus a sufficient excess force to insure proper seating of the cover 8 on seal ring 43. Adjustment of the deflection of the spring to attain the proper seating force is accomplished by extending or shortening the length of the turnbuckle link, i.e. eyebolts 54 and 55, and turnbuckle nut 56. The rotation of turnbuckle nut 56 in the appropriate direction will result in the desired change in length. The desired angle by which the mechanism extends beyond the dead center position is controlled by the position of stop bolt 66 as it bears on face 65. The degree of rotation afforded between cover 8 and hinge arm 45 in the plane of FIG. 3 is controlled by the setting of stop bolts 61 and 62.

Figure 4:
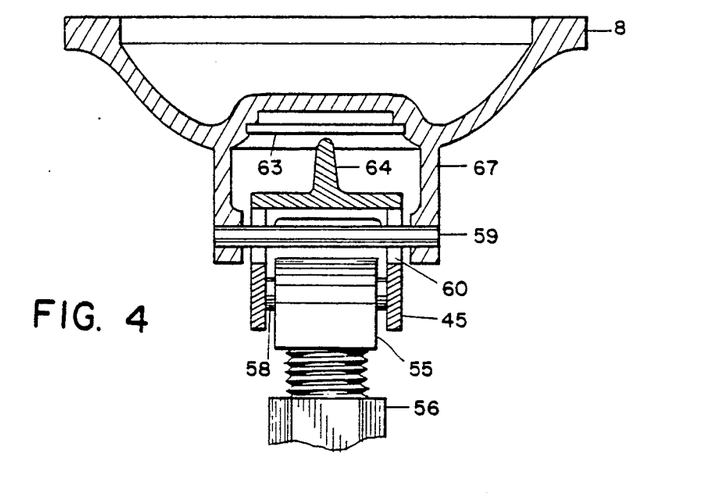
FIG. 4 shows the cross section of the lower cover of the autoclave transverse to the views shown in FIG. 2 and 3.

FIG. 4 shows a cross sectional view of the lower cover 8 and associated parts in a view normal to that shown in FIGS. 2 and 3. This view serves to show another aspect of the assembly including spring 63 and cover support ears 67. Slotted hole 60 in hinge arm 45, through which cover support pin 59 extends, is shown. The clearance shown between ears 67 and hinge arm 45 permits restrained rotation of the cover assembly 8, the ears 67, the spring 63 and the pin 59 with respect to arm 45 so as to permit adjustment of the cover 8 on the previously shown flange 41 in FIG. 3.

Nose portion 64 on hinge arm 45, which serves to control the defection of spring 63 is also shown. Hinge arm 45 and the associated driving mechanism, comprising the eyebolt 55, the pin 58 and the turnbuckle nut 56, partially shown in FIG. 4, completes this view of the cover and operating mechanism assembly.

Figure 5:
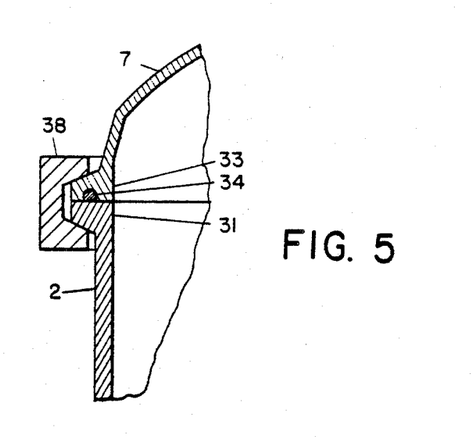
FIG. 5 is a partial enlarged cross sectional view through the upper cover of the autoclave locking mechanism of FIG. 2.

FIG. 5 shows one embodiment of a closure for the upper cover 7. It is held in pressure tight engagement with the pressure vessel upper flange 31. The sealing ring 34, the upper flange 31 and the cover flange 33 are locked together by the wedging action of clamp 38 which bears on the flanges.

Figure 6:
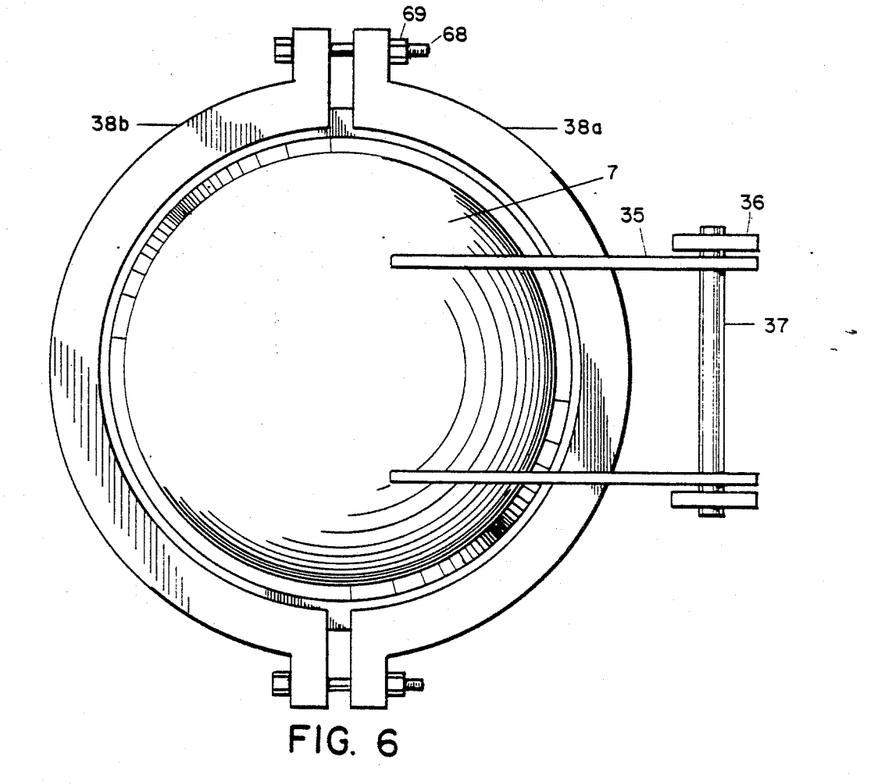
FIG. 6 is a plan view of the upper cover and locking mechanism of the autoclave of FIG. 2.

FIG. 6 shows a plan view of the upper closure in which upper clamp 38 is split into two halves 38a and 38b. The clamp may be tightened into a wedging position over the flanges by the use of bolts 68 and nuts 69. In larger installations, a powered split ring clamp may be substituted for the manually operated bolting arrangement.

Figure 7:
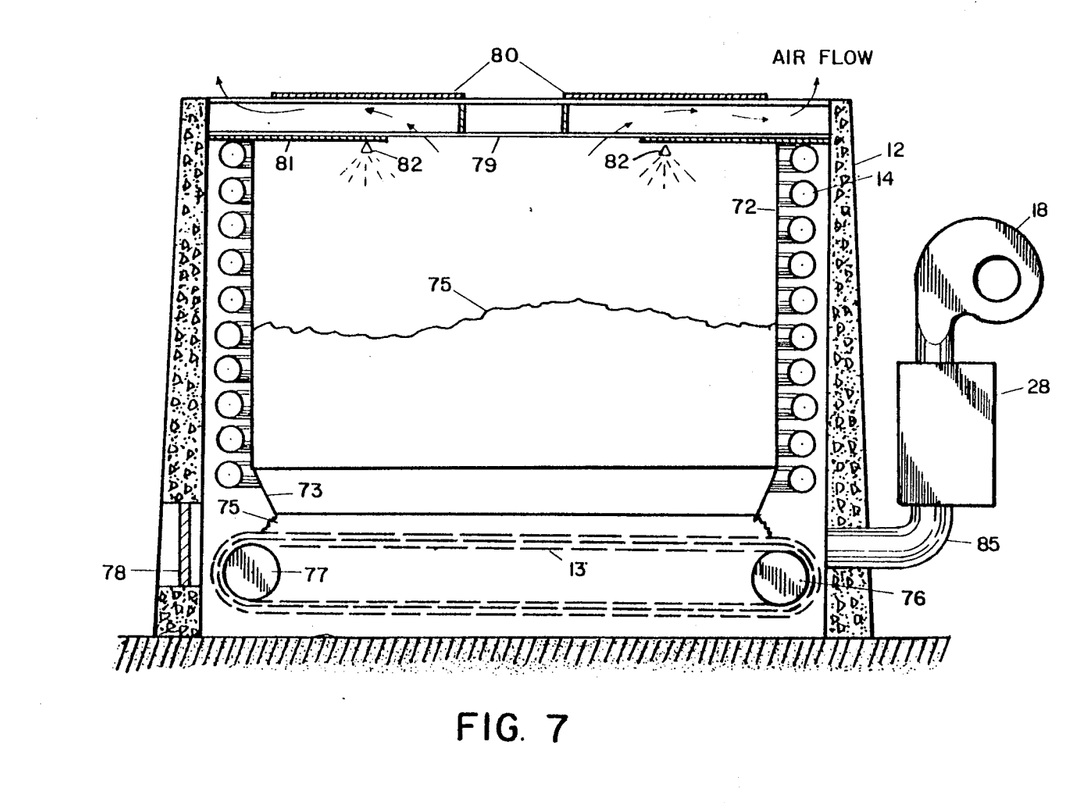
FIG. 7 is a cross sectional view of a composting pit, and the structures and equipment associated therewith.

FIG. 7 shows the arrangement of equipment in one embodiment of a composting pit used for the purpose of causing the waste material to be processed by composting. While this pit is not necessary where only material that is not biodegradable is processed or in small and infrequently used installations, it will expedite the process in larger and more frequently used installations for the treatment of municipal waste material. This pit will augment the composting process by maintaining proper temperature control of the contained material to provide optimum conditions for bacterial action and growth. It is well-known that composting bacterial action is more effective when temperatures are properly maintained. The pit also serves other functions which make it attractive even for the processing of non-biodegradable materials, e.g. containment to prevent scattering of the processed waste by wind or by the explosive decompressive process. It also will direct the steam from the process in controlled directions rather than permitting it to flow over the surrounding area. It will reduce the noise of the explosive decompression process by reducing the velocity of gas streams venting to the atmosphere; they may be expelled through appropriate baffles on the pit structure. It will assist in the handling and expelling of the waste product when fitted with a movable grate 13' which will result in a stoker-type action, expelling the final product from the bottom of the pile of treated material. It will be recognized that these features become increasingly important as the volume of material handled increases and as the proximity of habitation and traffic to the work site becomes closer.

FIG. 7 shows one embodiment of the pit which includes an exterior concrete or steel shell 12 surrounding heating coils 14 and an internal baffle 72 formed into a funnel-shaped configuration 73 at its lower end to insure placement of the waste material on the conveyor-grate 13'. Waste material 75 is maintained at a level suitable to give it time to compost as it migrates from top to bottom of the pile.

Conveyor belt grate 13' is mounted on driving sprockets 76 and 77 at each end of the belt which are motor driven to cause the carrying of the processed material in the direction of door 78 from which it may be removed from the pit.

The upper end of the pit is attached to a frame structure shown in this embodiment as an I-beam frame 79 capable of supporting the pressure vessel 2 (shown in FIG. 1), its hatch-closing mechanisms, the weight of its contents and such other apparatus as is contained on the vessel. This frame must also support the reaction loading from the process of the explosive decompression.

Also provided is an upper deck plate 80 and a lower baffle plate 81 which provides an exhaust vent for the steam during the explosive decompression process. Sprinklers 82 on plate 81 serve to introduce chemicals or bacteria-laden fluids to enhance the process or the product being composted. Air for enhancing the action of aerobic bacteria is introduced by blower 18 and heat exchanger 28 through ducting 85.

It may be noted that material handling devices such as loading and unloading conveyors, instrumentation, remote operating consoles, remote power operation of upper and lower hatch operating gears and similar appurtenances, or changes in the detailed configuration of various parts of the invention, may from time to time be added to improve the convenience, safety, speed and economy of operation. Accordingly, the invention is to be construed as including all of the modifications which fall within the scope of the appended claims.

DESCRIPTION OF OPERATION

Paper products to be fragmented into pulp or trash, rubbish, refuse, construction materials, garbage, animal and organic remains as normally received from municipal collections are mixtures containing material comminutable by the process of thermal explosive decompression. This material, as received, is loaded directly into pressure vessel 2. The material is charged through the upper loading hatch 7, the lower unloading hatch 8 being in the closed and sealed condition during the loading operation. When the pressure vessel 2 has been filled to its operating level, upper hatch 7 is closed and sealed.

As an alternative to the fragmentation of municipal waste or in addition thereto, metal castings may be cleaned with the present apparatus. These castings may be contained within a suitable wire basket (not shown) hung within the steam chamber of the pressure vessel. The wire mesh size should be capable of retaining the castings while permitting the expulsion of the waste shell mold and core material during decompression. The granular material will be expelled through the discharge tube of the autoclave. Where necessary the retained castings may be rinsed within the autoclave after decompression to ensure their being free from all mold material.

When a presoak is to be utilized, such as where paper products are being converted to pulp or where metal castings are being cleaned of shell and core material, the loaded vessel is charged with liquid from the tank 5C (FIG. 1). The composition of the liquid is determined as set forth above. After a period of time, such as approximately one half hour, the presoak liquid is drained from the autoclave. If desired, the pressure vessel 2 may be pressurized with steam during the presoak. This facilitates saturation of the material by forcing the liquid agents into the pores in the material. The pressure may be maintained while the presoak liquid is being drained prior to decompression.

When the material to be processed is gypsum based mold material, known as "soft shell", the presoak may involve an aqueous solution, e.g. 4000 ppm, of a strong wetting compound such as Triton X-100. Preferably the presoak takes place under pressure supplied by the steam boiler. The pressure and temperature of the steam causes the presoaking fluid to invade the mold material within 10 minutes, turning it to a soft slurry. In a test under these conditions about 99% of the shell and core material was removed from tea cup-sized castings during explosive decompression. An immediate rinse with water from a hose removed the remaining material. When an attempt was made to clean the same type of castings without the presoak, only marginal results were achieved and gypsum mold material continued to adhere to the castings. Thus, the action of the wetting agent to reduce the surface tension of the water and to allow it to penetrate the mold material more easily, is very beneficial to the process.

When the wetting agent was used in a presoak step on investment castings made from shell molds of compacted and bonded sand material, the bond of the mold material was too strong and it could not be removed from the castings by explosive decompression. To overcome this problem, a saturated solution of sodium hydroxide was used as the presoak fluid. This presoak took place over periods of from 30 minutes to one hour in steam heated water at a pressure of 100 psi. Upon explosive decompression, the sand was expelled and the castings was rendered free of shell and core materials. Similar results were obtained with a 5% solution of hydrofluoric acid during a simultaneous presoak and heating step that left the acid at 160° F. It should be noted, however, that regardless of the chemical agent used to attack the shell and core material bond, the decompression should not be delayed too long after the presoak fluid is drained, or the sand will resolidify.

Other tests have shown that when a sand core is merely subjected to an acid bath it takes up to 24 hours to remove it from the castings. However, after 30 minutes the castings can be cleaned by explosive decompression according to the present invention. In affect the acid weakens the bonds between particles enough to allow the steam to penetrate the core and make the decompression effective. These bonds between particles which in investment casting form "hard shell" are identified in the literature as intermolecular siloxane bonds. See Rusher et al., "Strength Factors of Ceramic Shell Molds", AFS Cast Metals Research Journal, 149–159 (1974). This penetration is enchanced by using a wetting agent in either the base or acid presoak. No adverse reaction between these chemicals has been noted when used together according to the present invention.

Although the waste material may comprise components which are readily amenable to fermentation, typical municipal waste of the type described in Table I also comprises a substantial proporation of starches, hemicelluloses and celluloses. The latter substances may be hydrolized or converted to fermentable sugars by enzymatic or chemical agencies during the presoak. Such hydrolysis will also convert fatty substances, such as the fatty contents of household garbage, to gylcerine which is useful in the manufacture of soap as well as other products.

Hydrolization of typical municipal waste in the pressure vessel will thus yield a useful liquid which has commercial value. It will also provide an additional or optional method for disposal of such products as paper, rags, garbage, yard trimmings, brush and other polyose substances which normally comprise approximately 63 per cent of the material received from municipal collections (as indicated in Table I). The process of recovery of saccharified products from the waste by hydrolysis may be of particular interest to larger cities where the volume of waste processed through the pressure vessel is sufficiently high to economically justify the hydrolization, where markets for the hydrolized liquid are apt to exist, and where a suitable final disposal site for the biodegraded material from the composting process may be at such distances from the pressure vessel as to make transportation, of even the reduced volume of the composting product from the composting site to the final disposal site, unattractive.

After or during presoak, steam from boiler 1 flows through isolation valves 21 and 4, pressure reduction valve 6, isolation valve 5, and pipe 3 to pressure vessel 2. This steam heats the contents and sterilizes them, and further saturates those parts which will absorb water, particularly biodegradable material with its cellular structure. Wetting agents introduced from the tank 5C facilitate hydration of the materials in the autoclave.

Pressure reducing valve 6 permits selection of a saturated steam boiler 1 operating at a pressure higher than that needed for the process, thereby providing a higher temperature for sterilization and heat transfer in the pressure vessel 2 without subjecting said vessel to higher than necessary pressure for the process, which would thereby increase the structural strength requirements of the vessel, and the piping and valves beyond the boiler and reducing valve. At the reduced pressure the steam is, of course, superheated. The loss of heat from the vessel is minimized by the insulation jacket 9. The temperature of saturated pressurizing steam varies with the pressure and it has been found that in general higher temperatures and pressures are particularly appropriate in preparing metal castings to be cleaned by decompression, while lower temperatures and pressures have been found suitable for treating paper products to be fragmented into pulp. Nevertheless successful fragmentation has been achieved with both materials where the internal pressure is brought to about 90 PSIG.

The tank 22 is isolatable from the atmosphere by valve 23, from the boiler 1 by valve 27 and from pressure vessel 2 by valve 25. With valve 24 open and valves 27 and 25 shut, tank 22 may be filled through valve 23 with chemicals which will benefit the process in the pressure vessel, such as by degrading plastic materials. With valve 23 shut and valves 25 and 27 open, the steam from boiler 1 will force the contents of tank 22 into pressure vessel 2 through pipe 24. During heating the pressure in the pressure vessel 2 is indicated by gauge 20, while relief valve 19 protects the tank from excess pressure. Drain line 10 and stop valve 11 serve as a means for quickly reducing pressure in the pressure vessel without discharging its contents.

Figure 8:
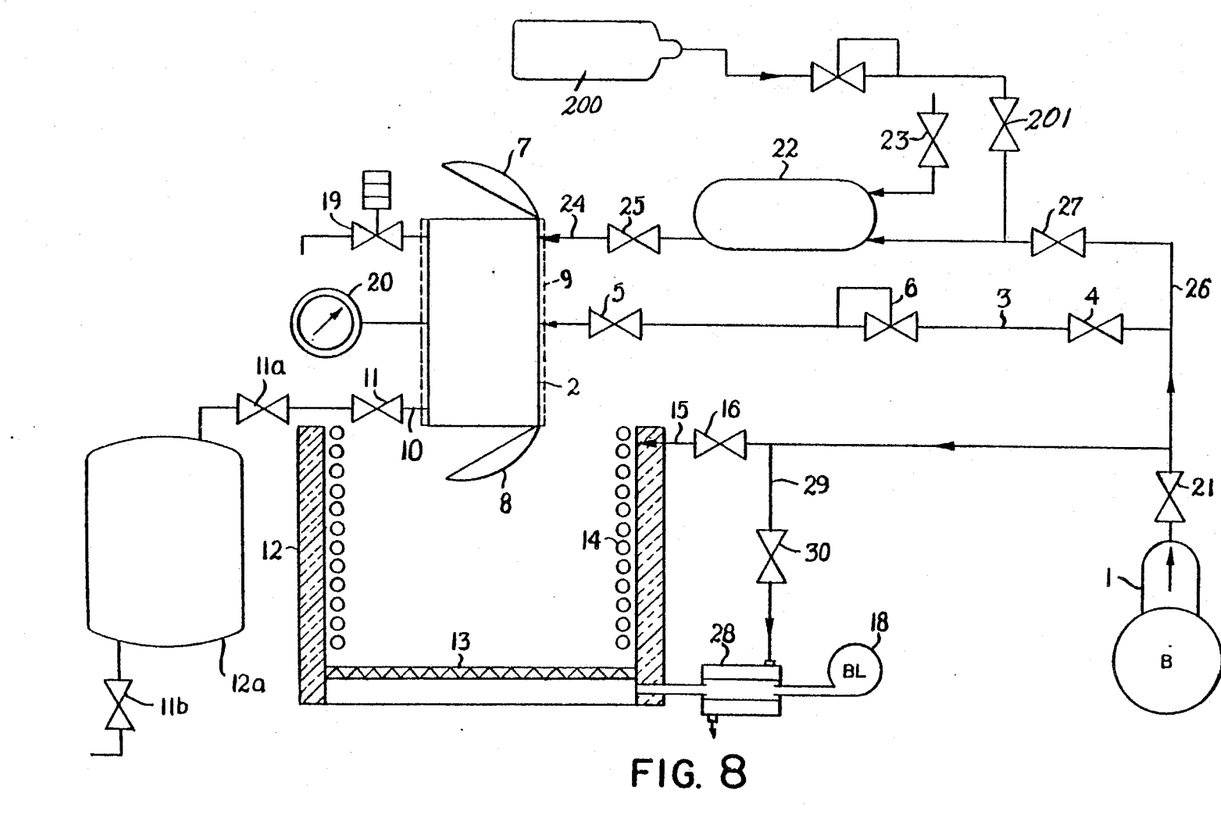
FIG. 8 is a schematic of still another preferred embodiment.

If hydrolization is to be accomplished during presoak, the arrangement of FIG. 1 is preferably modified to that of FIG. 8 which shows a typical arrangement for carrying-out the hydrolysis. FIG. 8 will be recognized as corresponding to FIG. 1 with the addition of certain components.

For the hydrolysis, the tank 22 is charged through valve 23 with a suitable concentrated acid, for example, sulfuric acid. Steam may then be admitted through valve 27 to force the acid from tank 22 into pressure vessel 2 as described before. The quantity of acid injected into the pressure vessel is preferably such as to give a concentration (with steam injection) in the steam of approximately 0.4 percent.

Alternatively, compressed air may be admitted to tank 22 from a compressed air tank 200 through valve 201. The compressed air then forces the acid into pressure vessel 2 in the same way as the steam from valve 27. Of course, the compressed air injection system may also be used, if preferred, with the apparatus described with reference to FIG. 1.

The acid converts cellulose-type materials in the municipal waste material in the pressure vessel to sugar, and fatty materials to glycerine. The acid and condensation from the steam in the pressure vessel as it is being pressurized washes the resulting sugars and glycerines to the bottom of the vessel.

As the level of liquid rises in the bottom of the pressure vessel, the liquid may be drained through drain 19 and valve 11a to a liquid receiving tank 12a. Tank 12a may be drained, as desired, into fermentation and other liquid treating apparatus (not shown).

The hydrolysis may be effectively carried out at a temperature of 300° F. (166° C.) and a pressure of about 6 atmospheres. The material remaining in the pressure vessel is then amenable to explosive decompression.

After hydrolysis (but before explosive decompression), the contents of the pressure vessel may be neutralized to the extent desired by the addition of calcium carbonate or a suitable caustic soda injected from the tank 22 in the same way previously described for other additions to the pressure vessel 2. Heat and vapor from this neutralization will merely add to the heating and pressurizing of the vessel. Of course, acid neutralization may also be accomplished in the composting pit after explosive decompression of the material (with proper precautions for acid spattering).

Either after or during the presoak step, the contents of the vessel 2 are heated and pressurized by steam from the boiler 1. At the end of the heating cycle, determined when the pressure stabilizes at the setting of the pressure regulator valve without significant flow of steam, quick opening hatch 8 is opened and the contents of pressure vessel 2 are discharged to the containing device 12 defining the pit. During the rapid discharge process the pressure on the contents of the vessel drops to atmospheric and all material, such as that of a cellular nature which contains water or certain sufficiently violatile liquids at the closed pressure vessel conditions of temperature and pressure, will be comminuted. This results from the contained water or liquid flashing to steam or vapor, increasing in volume, and rupturing the material in the expansion process.

Brittle materials such as glass which are sensitive to the effect of thermal gradients will rupture as the moisture on the surface cools as a result of flashing to steam at atmospheric conditions. This results in a glass surface temperature significantly below the temperature throughout the structure, placing the surface layers in tension and propagating cracks which will fracture the glass.

Devices which are made from metals, solid plastics, rubber and other materials, such as the metal castings held or retained by a wire mesh within the autoclave and which are not comminuted by this process, will remain within or pass through the pressure vessel in substantially unaltered condition. Lower hatch 8 is sufficiently large to pass the largest object that is acceptable for the process, there being no intention to process items normally categorized as junk, such as stoves, refrigerators, cars or other items of like substantial size and material not accepting water or containing liquids. The vertical orientation with upper and lower hatches is necessary to use the benefits of gravity in loading and particularly unloading the pressure vessel, since non-porous material of high density may not be effectively ejected by the expansion of the steam alone. An orientation of the vessel with a vertical axis and a hatch at the bottom permits such objects to fall out, eliminating the need for other cleaning operations.

The material which lands in pit 12 enters in a sterile condition and may be sprayed by sprinklers 82 (FIG. 7) with a preferred strain of bacteria which will optimize the composting of the biodegradable parts of the pit contents. Non-compostable elements will pass through the pit in a substantially unaltered condition and be discharged at the end of the composting process.

The pit 12 is sized to contain a number of loads from pressure vessel 2, and each load discharged will land on top of the load discharged in the last cycle, thereby causing successive layers of discharged material to build up over grate 13, each layer in turn being sprayed with selected bacteria. The rate at which composting takes place in the pit is governed by the nature and quantity of bacteria, the ratio of surface area to volume in the biodegradable mass of material, the temperature which is maintained throughout the mass, and a proper level of aerating, moisture, and agitation of the mass.

Temperature is maintained throughout the mass by the heating coils 14 around the periphery of the mass which, when heated with steam from boiler 1 as before described, act as a thermal buffer against heat loss through the side walls of the pit. Blower 18 provides atmospheric air through heat exchanger 28, which combination provides aeration at a suitable temperature throughout the mass. Agitation is accomplished by grate mechanism 13' (FIG. 7) during the process of discharging the lowest layer of material from the pit.

ANOTHER METHOD

The composting procedure described above is essentially a dry process producing an essentially dry, granular, composted product mixed with the non-comminuted portions (if any) of the waste material discharged from the fragmenting apparatus particularly when the composting is accomplished in the specially designed pit structure before described. An alternative to such dry composting (or an additional step after fragmenting the waste, but before or after such dry composting) is a fermentation process.

One product of the desired fermentation process is an alcohol. The resulting alcohol product, whether methal, ethyl or both, has commercial utility.

One commercial utility for such alcohol which has not heretofore been practical merely because of the cost of producing the alcohol is known to be as an additive for gasoline in internal combustion engines. Alcohol, being a nonlead compound, has advantage over tetraethyl lead heretofore well-known as such a gasoline additive in that it does not add lead to the pollutants discharged from internal combustion engines. Inasmuch as the alcohol produced by this process is derived from waste materials, the cost of collection of which need not be attributed entirely to the production of the alcohol but rather, at least in part, to the socially necessary collection of the waste materials, the cost of alcohol produced by the process will be lower than that of heretofore known processes to make the alcohol more readily acceptable as an additive for gasoline.

Other changes and modifications will occur to those skilled in the art. It is therefore intended that the scope of the present invention is not to be limited except as defined by the following claims.

We claim:

1. A method of fragmenting municipal waste materials part of which will absorb moisture and are frangible, and includes at least paper material as one ingredient, and part of which are non-frangible material selected from the group consisting of metals and plastics but which are associated with the frangible material, comprising the steps of:
   (a) compiling frangible waste materials to be fragmented and any associated non-frangible materials in a vessel,
   (b) introducing into the material-containing vessel a liquid bath including an aqueous solution of a wetting agent enhancing penetration of at least one of the frangible materials by the bath, to thereby facilitate separation of constituents in the frangible materials,
   (c) soaking the material in the baths for a predetermined period of time,
   (d) draining the vessel of excess liquid,
   (e) pressurizing and heating the interior of the vessel and its content with steam of at least 212° F. and at a predetermined pressure in a range of about 30 to 90 psi and
   (f) suddenly depressurizing the vessel interior and its contents to cause fragmentation of the frangible material.

2. A method according to claim 1, wherein said liquid bath includes an agent chemically active on an ingredient of the frangible materials so as to aid in fragmentation of the frangible materials.

3. A method according to claim 1, wherein the steps of introducing the liquid bath and soaking occur simultaneously with the step of pressurizing and heating.

4. A method according to claim 1, wherein the paper is to be fragmented into pulp, and wherein the liquid bath further includes a bleaching solution to dissolve inks carried on said paper materials.

5. A method according to claim 1, wherein the frangible waste materials include at least water saturable solid waste material as one ingredient.

6. A method according to claim 9, wherein said water saturable solid waste material includes at least one of the group of starches, hemicelluloses, celluloses, and fatty material; and wherein the liquid bath further includes an acid for converting the starches, hemicelluloses, and celluloses into sugars and the fatty material to glycerine.

7. A method according to claim 6, wherein the acid is a 3 to 5% solution of hot sulfuric acid.

* * * * *